US012689191B1

(12) United States Patent
Semolich

(10) Patent No.: US 12,689,191 B1
(45) Date of Patent: Jul. 21, 2026

(54) LOW VOLTAGE CABLE ROUGH-IN PLATE

(71) Applicant: Pacific Low Voltage, Ventura, CA (US)

(72) Inventor: Nick Semolich, Ventura, CA (US)

(73) Assignee: PACIFIC LOW VOLTAGE, Ventura, CA (US)

( * ) Notice: Subject to any disclaimer, the term of this patent is extended or adjusted under 35 U.S.C. 154(b) by 0 days.

(21) Appl. No.: 19/018,349

(22) Filed: Jan. 13, 2025

(51) Int. Cl.
 *H02G 1/00* (2006.01)
 *H02G 3/36* (2006.01)
(52) U.S. Cl.
 CPC ................. *H02G 1/00* (2013.01); *H02G 3/36* (2013.01)
(58) Field of Classification Search
 CPC ................................... H02G 1/00; G02G 3/36
 See application file for complete search history.

(56) References Cited

U.S. PATENT DOCUMENTS

2018/0023340 A1* 1/2018 Goldberg .................. E06B 9/50
 160/324

* cited by examiner

*Primary Examiner* — Nirvana Deonauth
(74) *Attorney, Agent, or Firm* — Cislo & Thomas LLP

(57) ABSTRACT

A rough-in plate to facilitate installation of cabling, such as low voltage cables, the rough-in plate having two opposing surfaces, a sidewall, and a hollow bushing connected to one surface at a through hole through the two opposing surfaces. Inside the hollow bushing can be a cable clip to temporarily hold the cabling while wall finishes are installed around the bushing of the rough-in plate. The rough-in plate is connected to a piece of framing by fastening one surface and the sidewall to the piece of framing so that the bushing projects perpendicularly to the wall finish when the wall finish is installed.

13 Claims, 9 Drawing Sheets

LOW VOLTAGE CABLE ROUGH-IN PLATE

TECHNICAL FIELD

This invention relates to devices for managing cables, such as low voltage cables during construction.

BACKGROUND

Installing low voltage cable during construction of a building, particularly after framing is complete and before any wall finishes are added can be inefficient because those involved with the construction may not be effectively communicating with those installing the low voltage cable. Oftentimes after the framing is complete and the low voltage cables are installed, the drywallers can end up covering or obstructing the low voltage cable. If the cables are no longer accessible, the drywall has to be torn up to access the low voltage cable, then reinstalled, thereby wasting time and resources.

For the foregoing reasons there is a need for a device that will allow for easy, unobstructed installation of low voltage cable when the construction team is unable to effectively communicate with the low voltage installation team.

SUMMARY

The present invention is directed to a low voltage cable rough-in plate for new construction or remodels designed to prevent the burial of low voltage cables in the wall cavity during the wall finish installation process. The rough-in plate comprises two opposing surfaces, and a hollow bushing connected to one surface at a through hole through the two opposing surfaces. Inside the hollow bushing can be a cable clip to temporarily hold the cabling while wall finishes are installed around the bushing of the rough-in plate. The rough-in plate is connected to a piece of framing, such as a stud, a post, a column, a beam, a shear wall, and the like, by fastening one surface to the piece of framing so that the bushing projects perpendicularly to the wall finish when the wall finish is installed. In some embodiments, the rough-in platen can comprise a sidewall improve the securement of the rough-in plate against the framing. In some embodiments, the rough-in plate can comprise gussets to support the sidewall.

DETAILED DESCRIPTION OF THE INVENTION

Figure 1:
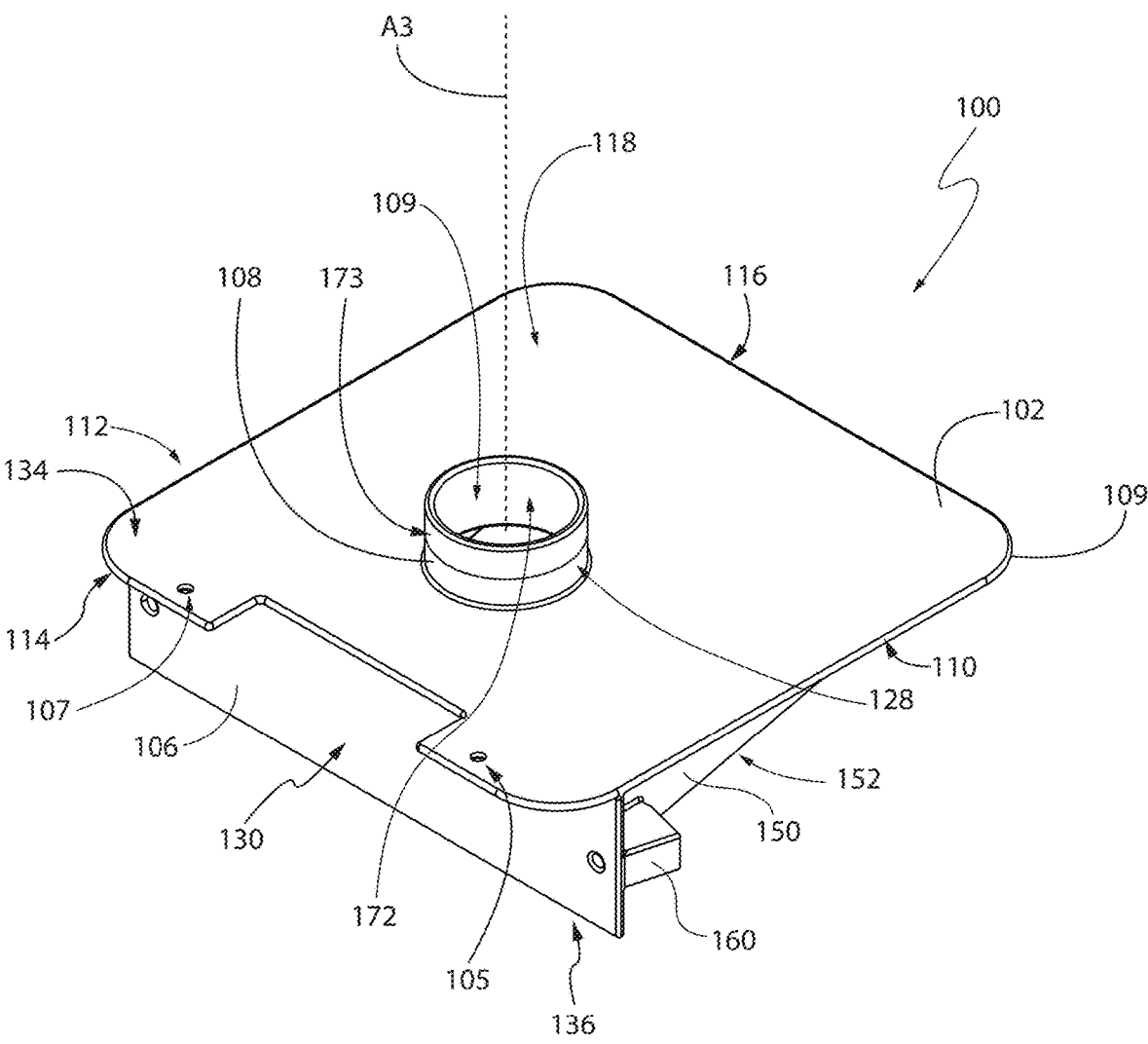
FIG. 1 shows a front perspective view of an embodiment of the rough-in plate of the present invention.
Figure 2:
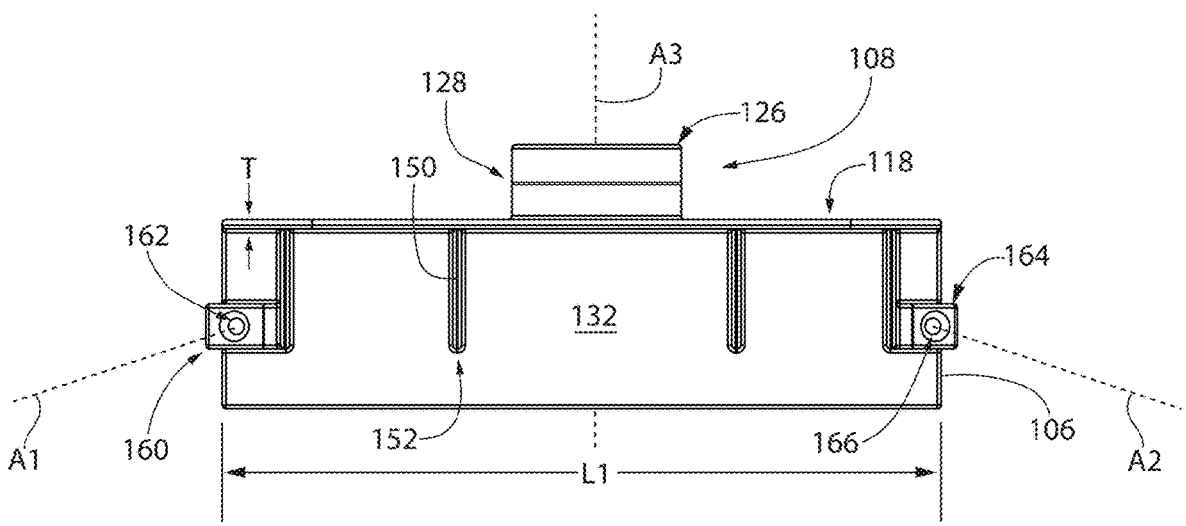
FIG. 2 shows a side elevation view of the rough-in plate shown in FIG. 1.
Figure 3:
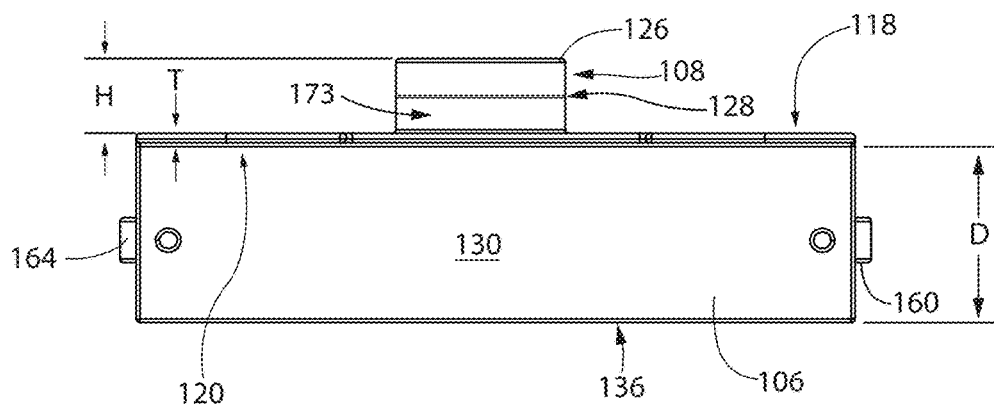
FIG. 3 shows a side elevation opposite the side elevation view shown in FIG. 2.
Figure 4:
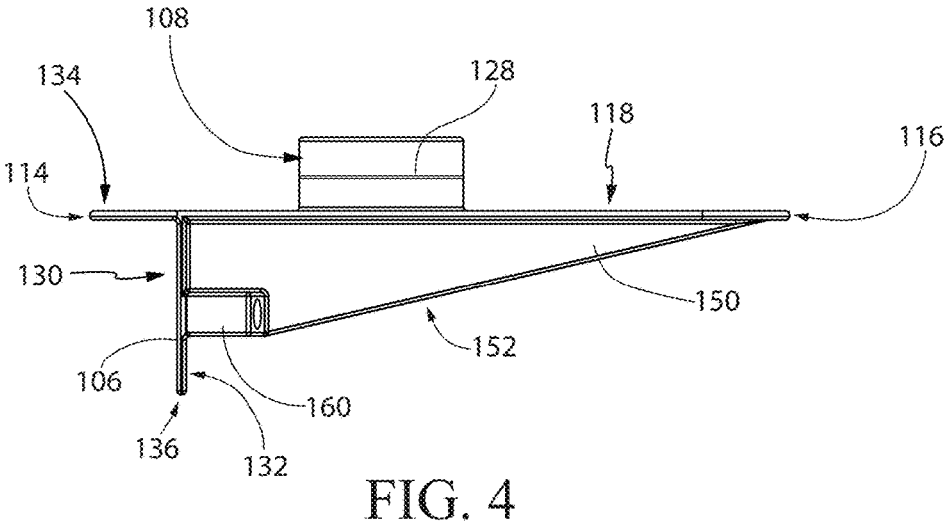
FIG. 4 shows another side elevation view of an embodiment of the rough-in plate shown in FIG. 1.
Figure 5:
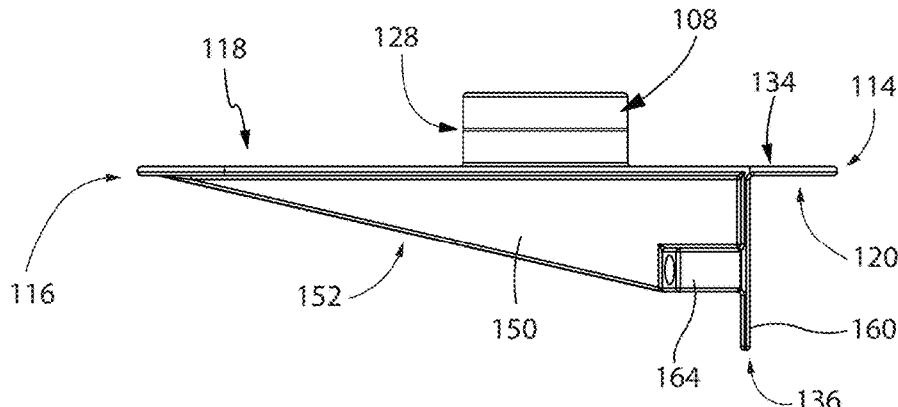
FIG. 5 shows a side elevation opposite the side elevation view shown in FIG. 4.
Figure 6:
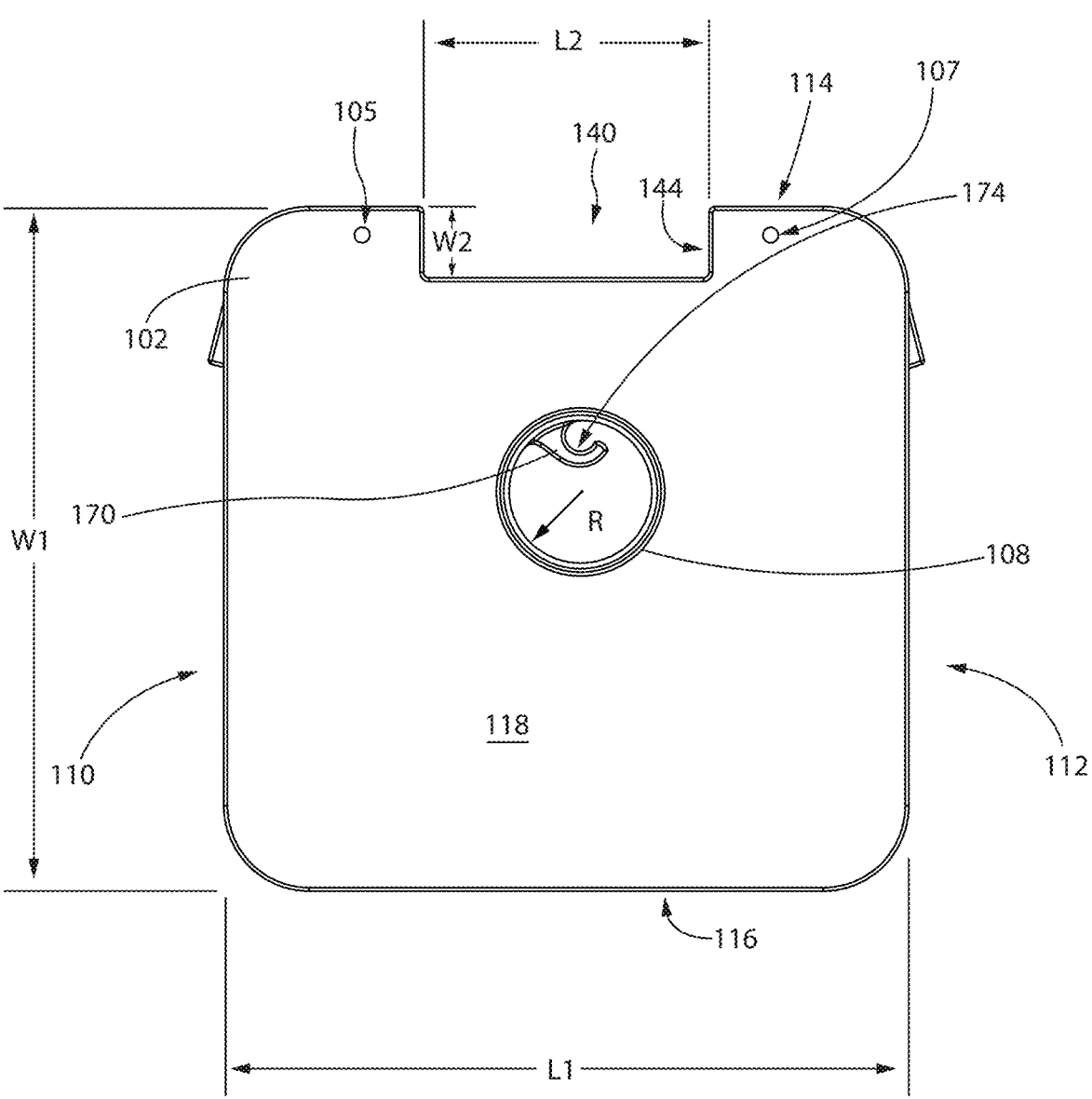
FIG. 6 shows a front plan view of the rough-in plate shown in FIG. 1.
Figure 7:
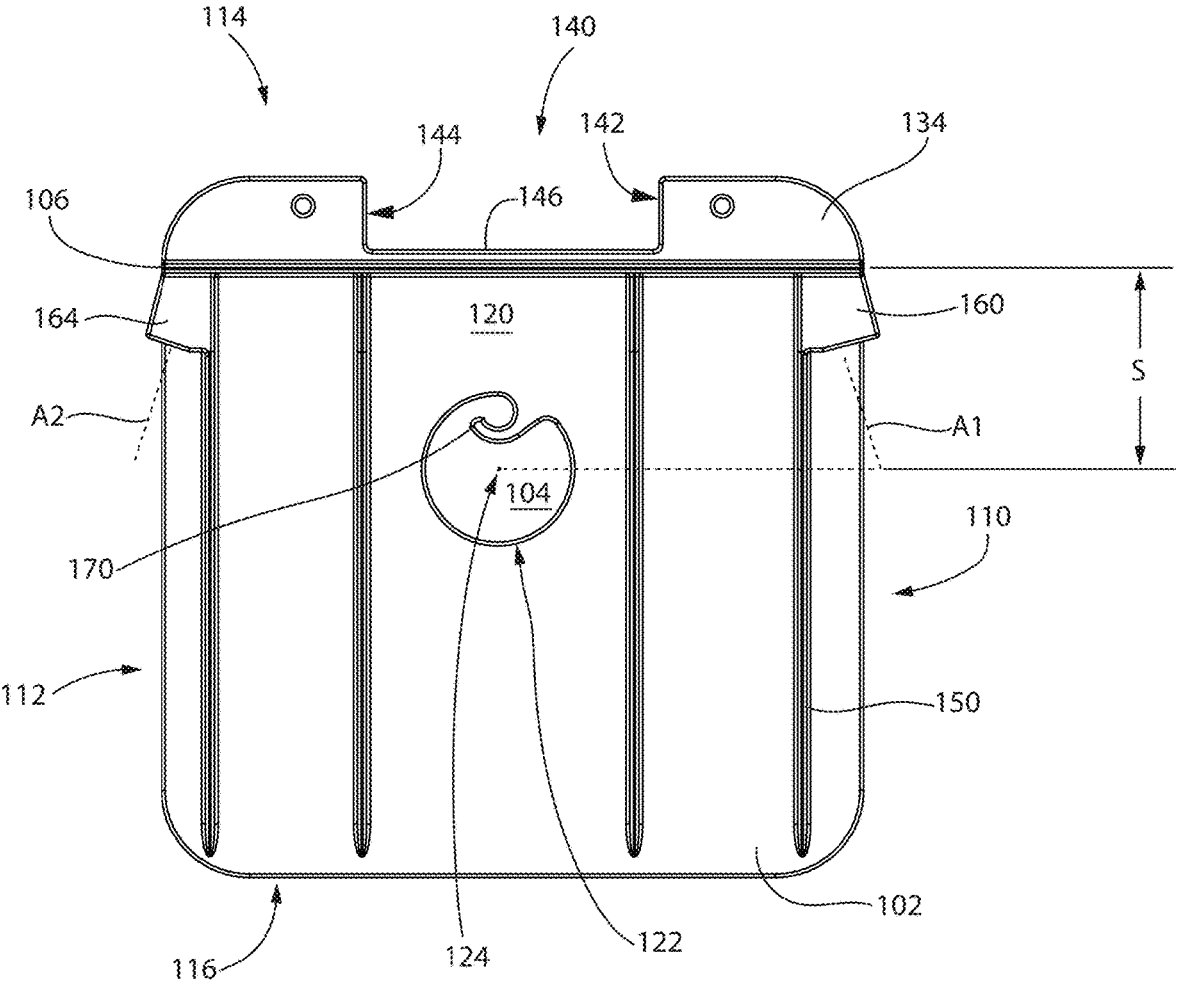
FIG. 7 shows a back plan view of the rough-in plate shown in FIG. 1.
Figure 8:
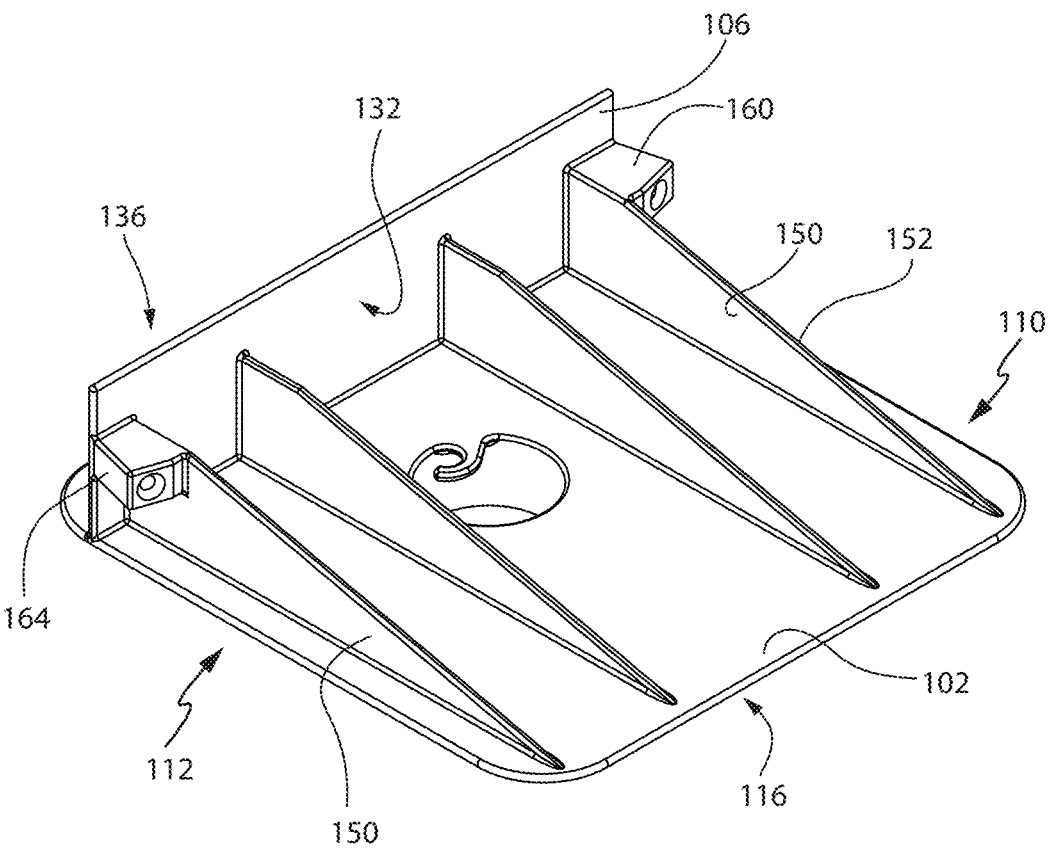
FIG. 8 shows a back perspective view of the rough-in plate shown in FIG. 1.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The invention of the present application is directed towards a low voltage rough-in plate 100 that facilitates low voltage cable installation in buildings and prevents construction errors after framing and before wall finishes, such as drywall or exterior walls. Construction is interpreted broadly to include a new build, a remodel, a renovation, a redesign, and the like. Buildings are interpreted broadly to include houses, homes, apartments, condominiums, duplexes, office buildings, commercial buildings, hotels, motels, and any other constructions in which people can dwell.

With reference to FIGS. 1-8, the standard rough-in plate 100 of the present invention comprises a plate body 102 defining a hole 104, a sidewall 106 attached to the plate body 102, and a bushing 108 extending from the plate body 102 at the hole 104. The sidewall 106 facilitates the plate body 102 being attached to the framing. The hole 104 allows for cabling to pass therethrough. The bushing 108 reduces construction errors by forcing installation of the wall finishes around the bushing 108, and therefore, with minimal disturbances to the cabling.

In the preferred embodiment, the plate body 102 comprise a first edge 110, a second edge 112 opposite the first edge 110, a third edge 114 adjacent to the first edge 110 and the second edge 112, a fourth edge 116 opposite the third edge 114 and adjacent to the first edge 110 and second edge 112, a first surface 118 bound by the first edge 110, the second edge 112, the third edge 114, and the fourth edge 116; a second surface 120 opposite the first surface 118 and bound by the first edge 110, the second edge 112, the third edge 114, and the fourth edge 116, wherein the plate body 102 defines a length L1 from the first edge 110 to the second edge 112, and a width W1 from the third edge 114 to the fourth edge 116. In the preferred embodiment, the plate body 102 is rectangular in shape.

However, the plate body 102 can be any other shape. As such, the plate body 102 comprises a perimeter edge 109 defining the bounds of the first surface 118 and the second surface 120. For example, the perimeter edge 109 can comprise a single edge defining a circle or an oval, three edges defining a triangle, four edges defining a rectangle (as in the preferred embodiment), five edges defining a pentagon, six edge defining a hexagon, and so on. In some embodiments, the plate body 102 can be amorphous, not taking on any particular commonly recognized shapes, or can take on other familiar and recognizable shapes that are not necessarily simple geometric shapes.

Preferably, the plate body 102 can have a length L1 from about 3 inches to about 12 inches. Preferably, the length L1 of the plate body 102 is about 4 inches to about 10 inches. More preferably, the length L1 of the plate body 102 is about 5 inches to about 8 inches. For example, the plate body 102 can have a length L1 of about 6 inches. Similarly the plate body 102 can have a width W1 from about 3 inches to about 12 inches. Preferably, the width W1 of the plate body 102 is about 4 inches to about 10 inches. More preferably, the width W1 of the plate body 102 is about 5 inches to about 8 inches. For example, the plate can have a width W1 of about 6 inches.

The hole 104 is created through the first surface 118 and the second surface 120, and defined by an interior edge 122. In the preferred embodiment, the hole 104 is circular in shape defining a center 124. As such, the interior edge 122 is circular. In the preferred embodiment, the center 124 of the hole 104 can be equidistant from the first edge 110 and the second edge 112. In addition, in the preferred embodiment, the hole 104 can be offset towards the sidewall 106 relative to the fourth edge 116. In other words, the hole 104 is positioned closer to the sidewall 106 than the edge (in this example, the fourth edge 116) opposite the sidewall 106. In some embodiments, the hole 104 can be positioned in the middle of the plate body 102, or closer to the first edge 110, closer to the second edge 112, closer to the third edge 114, or closer to the fourth edge 116 than the other edges. In some embodiments, the plate body 102 can define a plurality of holes 104 strategically located throughout the plate body 102 to increase the number and placement options for holding the cabling.

In the preferred embodiment, the hole 104 as defined by the interior edge 122 can have a radius R of about 0.25 inch to about 1.5 inch. Preferably, the radius R of the hole 104 is about 0.375 inch to about 1.25 inch. More preferably, the radius R of the hole 104 is about 0.5 inch to about 1 inch. For example, the hole 104 can have a radius R of about 0.625 inch. Although the preferred embodiment of the hole 104 is a circle, other shapes can also be used, such as triangular, square, pentagonal, hexagonal, ovoid, and the like, as well as any other amorphous or recognizable designs. In some embodiments, the shape of the hole 104 can be one that can create wedges, such as star-shaped. The wedges can be used to catch the cable.

In some embodiments, the plate body 102 can further define auxiliary holes 105, 107 that are configured or sized to receive fasteners. The auxiliary holes 105, 107 can be threaded or not. In general, the diameter of the auxiliary holes 105, 107 are substantially similar to typical fasteners than can be used to fasten the rough-in plate 100 in to a piece of framing, such as a nail or screw. Preferably, the auxiliary holes 105, 107 are defined on the plate body 102 in between the third edge 114 and the sidewall 106.

The bushing 108 extends away from first surface 118 at the location of the hole 104. Essentially, the bushing 108 is an extrusion of the interior edge 122 perpendicularly away from the first surface 118. As such, the bushing 108 can be coaxially aligned and in fluid communication with the hole 104. In addition, the bushing 108 can take on the same shape as the hole 104. In the preferred embodiment, the bushing 108 is hollow and cylindrical in shape terminating at a free end 126. As such, the bushing 108 can be a hollow cylinder having an inner wall 172 and an outer wall 173, wherein the inner wall 172 defines a hollow interior. The bushing 108 can have a height H from the first surface 118 to the free end 126 that is about the thickness of the wall finish that is attached to the framing. In general, wall finishes, such as drywall, can range from about 0.25 inch to about 0.625 inch. As such, the bushing 108 can have a height H from about 0.25 inch to about 0.625 inches. In some embodiments, the rough-in plate 100 is applied to the exterior wall. Exterior walls can have wall finishes ranging from about 1 inch to about 1.5 inch. As such, the bushing 108 can have a height H of about 1 inch to about 1.5 inch. Therefore, the bushing 108 can have a height ranging from about 0.25 inch to about 1.5 inch. In some embodiments, rather than manufacturing rough-in plates with bushing heights that match a specific wall finish application, the rough-in plate 100 can have a bushing 108 with a single initial height H, but with score-lines 128 circumscribing the bushing 108. The scoreline 128 allows a top portion of the bushing 108 (i.e. above the scoreline 128) to be easily cut off to change the final height H of the bushing 108.

As such, the height H of the bushing 108 can be from about 1 inch to about 1.5 inch. Preferably, the height H of the bushing 108 is about 1.25 inch. Scorelines can be created at a height H of 0.25 inch, 0.5 inch, 0.625 inch, 0.75 inch, 1 inch, and the like, depending on the standard thicknesses of wall finishes. In some embodiments, there may be one scoreline 128 at the most popular interior wall finish thickness. In some embodiments, a bushing 108 can have multiple scorelines 128 at heights corresponding to the different interior wall finish thicknesses. As such, the rough-in plate 100 can be manufactured with the maximum bushing height H to simplify the manufacturing process. But in use, the bushing height H can be cut off to the desired height. Due to the scoreline 128, no tools would be required to break of the top portion of the bushing 108 for the desired height.

The sidewall 106 can be connected to the second surface 120 of the plate body 102 adjacent to the third edge 114. When the rough-in plate 100 is properly installed onto a piece of framing, such as a stud, a post, a column, a beam, and the like, from the perspective of the user, the sidewall 106 extends rearwardly in the direction of what would become the interior of the walls. The sidewall 106 can have a lateral side 130 facing in the direction of the third edge 114, and a medial side 132 facing in the direction of the hole 104 or the fourth edge 116 opposite the lateral side 130. The lateral side 130 can be a flat, planar surface configured to mount to a piece of framing. To facilitate mounting the lateral side 130 to a piece of framing, the sidewall 106 can be set medially inwardly from the third edge 114. Offsetting the sidewall 106 from the third edge 114 creates a lip 134 at the third edge. The lip 134 and the sidewall 106 creates a corner that can be used to align the plate body on the piece of framing. The sidewall 106 can be offset from the third edge 114 by about 0.25 inch to about 2 inches. Preferably, the offset is 0.5 inch to about 1.5 inch. More preferably, the offset is about 0.75 inch to about 1 inch. The depth D of the sidewall 106 as measured from the second surface 120 to a free edge 136 of the sidewall 106 can be about 0.75 inch to about 4 inches. Preferably, the depth D of the sidewall 106 can be about 1 inch to about 3 inches. More preferably, the depth D of the sidewall is about 1.5 inch to about 2 inches. Preferably the sidewall 106 extends the full length L of the plate body 102 from the first edge 110 to the second edge 112. However, the sidewall 106 can stop short of the first edge 110 and/or the second edge 112.

In the preferred embodiment, the hole 104 is positioned closer to the sidewall 104 than the fourth edge 116. For example, the shortest distance S from the sidewall 106 to the center 124 of the hole 104 (i.e. a line perpendicular to the sidewall 106 measured from the sidewall to the center 124 of the hole 104) can be about 0.625 inch to about 4 inches. Preferably, the shortest distance S can be about 1 inch to about 3 inches. More preferably, the shortest distance S can be about 1.5 inch to about 1.625 inch. However, the hole 104 can be positioned elsewhere on the plate body 102.

In the preferred embodiment, a cutout 140 can be formed into the third edge 114 adjacent to the lateral side 130 of the sidewall 106. The cutout 140 can be from the third edge 114 to the lateral side 130 or an inset edge 146. The cutout 140 creates a pair of medial edges 142, 144 facing each other and perpendicular to the sidewall 106. The cutout 140 can have a length L2 as measured from the first medial edge 142 to the second medial edge 144 of about 1 inch to about 4.5 inches. Preferably, the length L2 of the cutout 140 is about 2 inches to about 3.5 inches. More preferably, the cutout 140 is about 2.5 inches to about 3 inches. The width W2 of the cutout 140 can be about 0.25 inch to about 2 inches. Preferably, the width W2 of the cutout is about 0.5 inch to about 1 inch. The length L2 of the cutout 140 can be about 20 percent to about 80 percent of the length L1 of the plate body 102. In some embodiments, the length L2 of the cutout 140 can be about 30 percent to about 70 percent the length L1 of the plate body 102. In some embodiments, length L2 of the cutout 140 can be about 40 percent to about 60 percent the length L1 of the plate body 102.

To improve the structural integrity of the plate body 102, a gusset 150 can extend across the second surface 120 from the sidewall 106 towards the fourth edge 116 to buttress the sidewall 106. Preferably, a plurality of gussets 150 arranged in parallel can be buttressed against the sidewall 106. The gussets 150 are thin, flat plates or brackets that strengthen and support the vertical elevation of the sidewall from the second surface 120. The gussets 150 are connected to the sidewall 106 at the medial side 132 and extend along the second surface 120 of the plate body 102. Connection of the gussets 150 to the plate body 102 provides support for the sidewall 120. In the preferred embodiment, the gussets 150 are triangular in shape in which a back edge 152 of the gusset 150 that projects away from the second surface 120 tapers towards the second surface 120 moving from the sidewall 106 towards the fourth edge 116.

In the preferred embodiment, in order to facilitate fastening of the rough-in plate 100 to the piece of framing, a first boss 160 can project from the from the medial side 132 of the sidewall 106 adjacent the first edge 110. The first boss 160 can define a first through-hole 162, preferably, a threaded hole. The first through-hole 162 defines a first longitudinal axis A1. In the preferred embodiment, the first longitudinal axis A1 of the first through-hole 162 can be non-perpendicular to the medial side 132 of the sidewall 106. Specifically, the first longitudinal axis A1 angles away first edge 110 and the second edge 112 and parallel to the second surface 120 to create a non-perpendicular angle with the medial side 132 of side wall 106.

Similarly, in the preferred embodiment, a second boss 164 can project the from the medial side 132 of the sidewall 106 adjacent the second edge 112. The second boss 164 can define a second through-hole 166. Preferably, the second through-hole 166 is a threaded hole. The second through-hole 166 defines a second longitudinal axis A2. In the preferred embodiment, the second longitudinal axis A2 of the second through-hole 166 can be non-perpendicular to the medial side 132 of the sidewall 106 and parallel to the second surface 120. Specifically, the second longitudinal axis A2 angles away from the first longitudinal axis A1 in a mirror image fashion. The first boss 160 and the second boss

164 facilitate fastening the rough-in plate 100 to the piece of framing by providing a guide for the fasteners, such as screws and nails, to be fastened to the piece of framing.

In the preferred embodiment, a cable clip 170 can project radially inwardly into the space defined by the hole 104 and bushing 108. As such, the cable clip 170 can be connected to the inner wall 172 of the bushing 108 or the interior edge 122 defining the hole 104. The cable clip 170 extends towards a longitudinal axis A3 defined by the bushing 108 and the hole 104. In the preferred embodiment, the cable clip 170 defines a wedge 174 into which the cabling can be caught so as not to fall out of the hole 104. In the preferred embodiment, the wedge 174 can be in the form of a curved, hooked, or bent tip. The wedge 174 can be any other shape and design in which the cabling can be caught so as not to fall out of the hole 104.

In some embodiments, the rough-in plate 100 for the framing can have the sidewall 106, the gussets 150, and/or the bushing 108 attached with a reversible connection. The reversible connection can be one in which two pieces can be connected then disconnected, then reconnected again. For example, the pieces can snap-fit together or use resistance fit. In some embodiments, the pieces may connect using tongue and groove connections, dove-tail connections, clips, hooks, magnets, and the like.

In another embodiment, the connection of the sidewall 106, the gussets 150, and/or the bushing 1089 can be via a compromised connection. A compromised connection can be a break-away connection in which the structural integrity at the connection is weakened such that the one piece can be broken off from another piece without the use of cutting tools. The scoreline 128 is an example of a compromised connection.

In some embodiments, the bushing 108 can have a compromised connection at the junction where the bushing 108 meets the first surface 118. The sidewall 106 can have a compromised connection where the sidewall 106 meets the second surface 120. The gussets 150 can have compromised connections where the gussets 150 meet the second surface 120 and the sidewall 106.

In one example, the rough-in plate 100 is completely molded from ABS plastic having a length L1 of about 6 inches a width W1 of about 6 inches and a thickness T of about 0.078125. Four gussets 150 are formed onto the second surface 120 of the plate 100 to support a sidewall 106. The sidewall 106 can have bosses 160, 164 extending therefrom at opposite ends, each boss 160, 164 defining threaded through holes 162, 166 to accommodate screws for attaching to a wooden or steel piece of framing. On the plate body 102, centered between the first edge 110 and the second edge 112, and 1 inch from the sidewall is a 1.25 inch hole, which will continue into a bushing 108 formed on the front surface 118 of the plate body 102. The bushing 108 is designed for protruding through newly applied wall finishes and allowing cable to be pulled through. Formed on the plate body 102 at the entry of the bushing 108 is a cable clip 170 for holding, for example, a 0.25 inch cable securely in place. The bushing 108 can be a total of 1.25 inch deep with a scoreline 128 after the first 0.625 inch of depth to allow for ease of removal. This will allow for the choice of protrusion through either 0.625 inch interior wall finishes or a 1.25 inch exterior wall finishes.

In some embodiments, the rough-in plate can be installed on a shear wall, referred to herein as the shear wall rough-in plate 200. In such situations, a sidewall may not be required. If the sidewall is not required, the gussets are also not required. This is because for a shear wall, the shear wall rough-in plate 200 attaches flat to the shear wall. As such, the shear wall rough-in plate 200 comprises a plate body 202 defining a hole 204, and a bushing 208 extending from the plate body 202 at the hole 204. The hole 204 allows for cables to pass therethrough, and the bushing 208 reduces construction errors by forcing installation of the wall finishes around the bushing 208. The details regarding the plate body 202, the hole 204, the bushing 208, and the cable clip 270 are essentially the same as described for the embodiment shown in FIGS. 1-8 and incorporated here by this reference. As such, the shear wall rough-in plate 200 also comprises a perimeter edge 109 (for example, a first edge 210, a second edge 212, a third edge 214, and a fourth edge 216), first surface 218, a second surface 220, an interior edge 222 defining the hole 204, a free end of bushing 226, a scoreline 228, a cable clip 270, an inner wall of bushing 272, an outer wall of bushing 273, and a wedge 274 defined by the cable clip 270 as described above for FIGS. 1-8. The shear wall rough-in plate 200, however, does not have the sidewall 106, gussets 150, and bosses 160, 164.

Figures 9, 10:
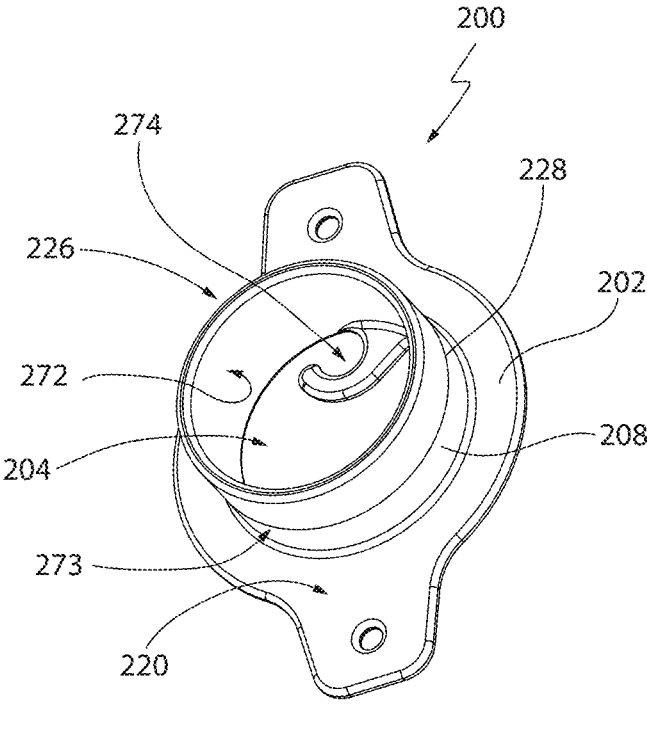
FIG. 9 shows a back perspective view of another embodiment of the present invention.
FIG. 10 shows a front perspective view of the embodiment shown in FIG. 9.
Figure 11:
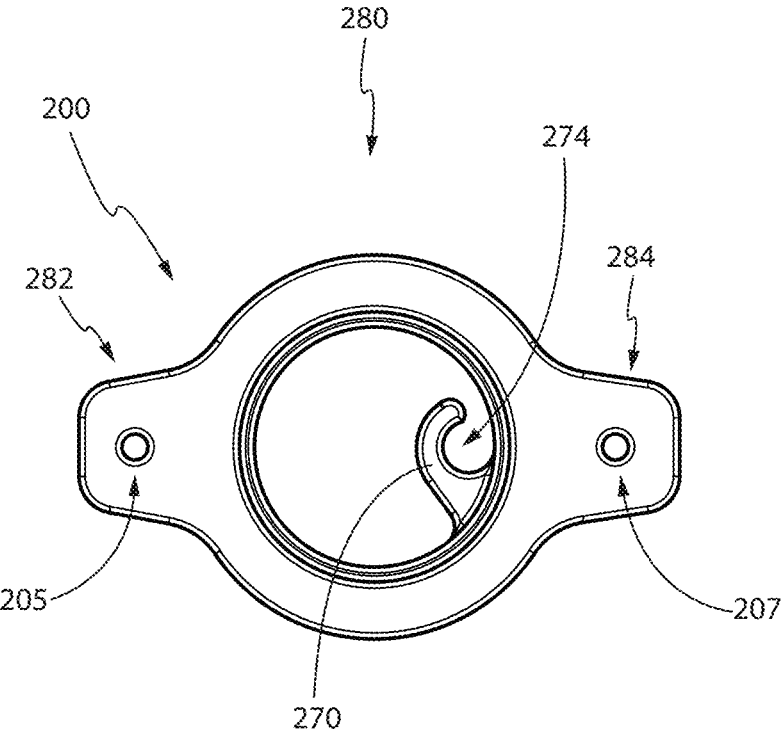
FIG. 11 shows a front plan view of the embodiment shown in FIG. 9.

Another difference between the standard rough-in plate 100 for the framing and the shear wall rough-in plate 200 is the shape and size of the plate body 202. Because the shear wall rough-in plate 200 is essentially the plate body 202 with the bushing 208, the plate body 202 lays flat against the shear wall. As such, the plate body 202 can be much smaller. Essentially, the plate body 202 only requires enough surface area upon which the bushing 208 can be mounted and allow for one or two auxiliary holes 205, 207 through which fasteners, such as screws or nails, can be inserted to mount the plate body 202 to the shear wall. As such, the plate body 202 can be circular, oval, triangular, rectangular, pentagonal, hexagonal, stadium or pill shaped, and the like, and any combination thereof. For example, the embodiment shown in FIGS. 9-11 has a circular center portion 280 with rectangular portions 282, 284 at opposing ends surrounding the circular center portion 280. The auxiliary holes 205, 207 can be created in the rectangular end portions 282, 284 for fastening the plate body 202 to the shear wall. The bushing 208 in this embodiment also has the same scoreline 228 to allow for the bushing 208 to be made into different heights.

Figure 12:
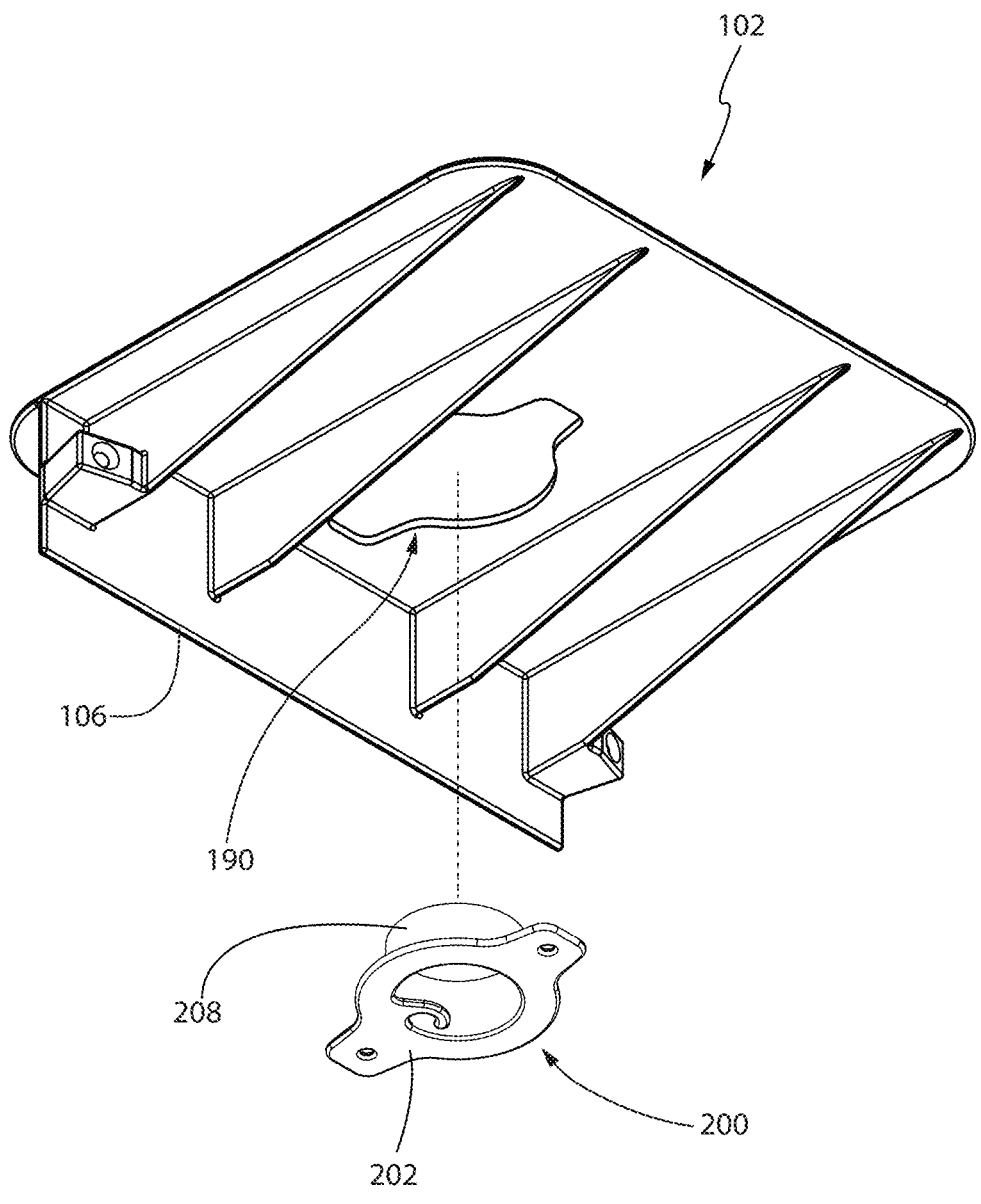
FIG. 12 shows a perspective view of another embodiment of the present invention.

In some embodiments, as shown in FIG. 12, the shear wall rough-in plate 200 can be integrated into the standard rough-in plate 100. For example, in the standard rough-in plate 100, the shear wall rough-in plate 200 can take the place of the hole 104 and bushing 108 of the standard rough-in plate 100. As such, a cutout 190 in the shape of the plate body 202 of the shear wall rough-in plate 200 can be created in the standard rough-in plate 100. The plate body 202 of the shear wall rough-in plate 200 can be attached to the standard rough-in plate 100 at the cutout 190. The attachment can be a reversible attachment or a compromised connection so that the shear wall rough-in plate 200 can be connected or disconnected from the standard wall rough-in plate 100.

In some embodiments, the standard rough-in plate 100 can have a scoreline outlining the shape of the shear wall rough-in plate 200 as the compromised connection. Therefore, if the user needs a shear wall rough-in plate 200, the user simply punches out the shear wall rough-in plate 200 from the standard rough-in plate 100. As such, a single rough-in plate can be used for either application.

Therefore, from a manufacturing standpoint, the standard rough-in plate 100 and shear wall rough-in plate 200 can be formed as a single integral piece of plastic. Alternatively, the various pieces, such as the plate body, the sidewall and the bushing can be created separately and attached together. The pieces formed integrally as a single piece or multiple pieces can be manufactured using standard techniques, such as injection molding, additive manufacturing (3D printing, fused deposition modeling, stereolithography, selective laser sintering, etc.), CNC machining, casting, and the like.

In use, at the rough-in stage of construction when the framing is complete, but the wall finishes have not been installed, the user (e.g., low voltage installer, low voltage technician, electrician, and the like), places the standard rough-in plate 100 against a piece of framing at the desired location along the piece of framing. For example, the piece of framing can be a 2×4, 2×6, and the like. The front side of the piece of framing refers to the side of the framing onto which the wall finish, such as dry wall, is applied. The lateral sides of the piece of framing are adjacent to the front side and face adjacent framing pieces. The standard rough-in plate 100 is placed at the corner of the front side and lateral side of a piece of framing at the desired height. The sidewall 106 is placed flush against the lateral side of the piece of framing, and the second surface 120 at the third edge 114 (i.e., the lip 134) is placed flush against the front side of the piece of framing. Nails or screws can be inserted through the auxiliary holes 105, 107 to fasten the plate body 102 to the front side of the piece of framing. Nails or screws can be inserted through the first and second through-holes 162, 166 of the first boss 160 and the second boss 164, respectively, to fasten the sidewall 106 to the lateral side of the piece of framing. Low-voltage cables that have been wired throughout the building can be passed through the hole 104. The cables can be bunched inside the hole 104 to store the cables at that location. The cables can also be wedged into the cable clip 170 for more secure storage. If the height H of the bushing 108 is not correct for the application, the top portion of the bushing 108 can be snapped off at the scoreline 108 at any step.

At this point, the construction workers can return to the building site and begin installing the wall finish, such as the drywalls. When the construction worker comes across a standard rough-in plate 100, the construction worker has no choice but to cut out a hole in the wall finish that corresponds with the location of the bushing 108 or otherwise install the wall finish around the bushing 108. No communication is required between the construction worker and the low voltage installer. In addition, the likelihood that the construction worker dislodges the low voltage cables causing the low voltage cable to fall behind the drywall is minimal. Once the wall finish is complete, the low voltage installer can return and finish the wiring by adding the proper wall plate, cover plate, and the like.

Installation of the shear wall rough in plate 200 is even easier as the user need only to secure the shear wall rough-in plate 200 flatly onto the shear wall. As such, the user can cut out a hole in the shear wall that correspond with the hole 204 of the shear wall rough-in plate 200. The user places the second surface 220 flat on the shear wall so that the hole in the shear wall aligns with the hole 204 in the rough-in plate 200. Fasteners are driven into the auxiliary holes 205, 207, and the cabling is hooked up the same as the standard rough-in plate 100. If the shear wall rough-in plate 200 is integrated into the standard rough-in plate 100, then the shear wall rough-in plate 200 can be snapped out from the standard rough-in plate 100 prior to installation.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A method of installing a low voltage cable at a rough-in stage of construction of a building prior to installation of a wall finish, the method comprising the steps of:

a) providing a rough-in plate, comprising a plate body, comprising a perimeter edge, a first surface bound by the perimeter edge, and a second surface opposite the first surface and bound by the perimeter edge; a hole defined through the first surface and the second surface, the hole defined by an interior edge and defining a center; a bushing extending away from first surface, the bushing coaxially aligned with the center of the hole and in fluid communication with the hole, the bushing comprising an outer wall and an inner wall defining a hollow interior; and a cable clip connected to the interior edge of the hole or the inner wall of the bushing and projecting radially inwardly into the hole;

b) placing the rough-in plate against a piece of framing with the second surface against a front side of the piece of framing;

c) fastening the plate body to the front side of the piece of framing;

d) connecting cabling throughout the building;

e) passing the cabling into the hole; and f) securing the cabling with the cable clip.

2. The method of claim 1, further comprising installing the wall finish around the bushing of the rough-in plate so that the cabling is accessible.

3. The method of claim 2, wherein a hole is created in the wall finish that corresponds with a location of the bushing.

4. The method of claim 2, further comprising completing installation of the cabling.

5. The method of claim 1, wherein the rough-in plate further comprises a sidewall connected to the second surface of the plate offset from the hole, the sidewall comprising a lateral side facing away from the hole, and a medial side facing towards the hole; wherein the method further comprises placing the sidewall against a lateral side of the piece of framing, and fastening the sidewall to the lateral side of the piece of framing.

6. The method of claim 5, further comprising breaking the bushing along a scoreline circumscribing the bushing.

7. The method of claim 6, wherein the scoreline has at a height of about 0.625 inch from the first surface.

8. The method of claim 7, wherein the bushing has a height of about 1.25 inch from the first surface.

9. The method of claim 5, wherein the perimeter edge comprises at least a first edge, a second edge opposite the first edge, and a third edge adjacent to the first edge and the second edge.

10. The method of claim 9, wherein the sidewall is adjacent the third edge.

11. The method of claim 10, wherein a shortest distance from the sidewall to the center of the hole is about 1.625 inch.

12. The method of claim 10, wherein the sidewall is set medially inwardly about 0.75 inch from the third edge.

13. The method of claim 5, wherein the step of fastening the plate body to the front side of the piece of framing comprises inserting a fastener through a first boss and a second boss, a) the first boss projecting from the medial side of the sidewall, the first boss defining a first hole that defines a longitudinal axis that is non-perpendicular to the medial side; and b) the second boss projecting from the medial side of the sidewall opposite the first boss, the second boss defining a second hole that defines a longitudinal axis that is non-perpendicular to the medial side.

* * * * *